(12) United States Patent
Armistead (10) Patent No.: US 7,668,158 B2
(45) Date of Patent: *Feb. 23, 2010

(54) PACKET-SWITCHED TELEPHONY WITH CIRCUIT-SWITCHED BACKUP

(75) Inventor: R. Ashby Armistead, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 905 days.

This patent is subject to a terminal disclaimer.

(21) Appl. No.: 10/916,054

(22) Filed: Aug. 9, 2004

(65) Prior Publication Data

US 2005/0025134 A1   Feb. 3, 2005

Related U.S. Application Data

(63) Continuation of application No. 09/304,032, filed on May 3, 1999, now Pat. No. 6,781,983.

(51) Int. Cl.
    *H04L 12/66*   (2006.01)
(52) U.S. Cl. .................................. 370/353; 370/401
(58) Field of Classification Search ......... 370/351–357, 370/401, 248; 455/1
    See application file for complete search history.

(56) References Cited

U.S. PATENT DOCUMENTS

| | | | |
|---|---|---|---|
| 5,726,984 A | 3/1998 | Kubler et al. | 370/349 |
| 5,903,558 A * | 5/1999 | Jones et al. | 370/351 |
| 5,953,312 A | 9/1999 | Crawley et al. | 370/218 |
| 5,974,043 A | 10/1999 | Solomon | 370/352 |
| 6,064,653 A | 5/2000 | Farris | 370/237 |
| 6,078,582 A | 6/2000 | Curry et al. | 370/356 |
| 6,115,580 A * | 9/2000 | Chuprun et al. | 455/1 |
| 6,118,780 A * | 9/2000 | Dunn et al. | 370/355 |

(Continued)

FOREIGN PATENT DOCUMENTS

WO   WO 97/18665   5/1997

OTHER PUBLICATIONS

Bob Emmerson, "Internet Telephony", May 1997 BYTE, p. 3.

*Primary Examiner*—Steven H Nguyen
*Assistant Examiner*—Jeffrey M Rutkowski
(74) *Attorney, Agent, or Firm*—Stolowitz Ford Cowger LLP

(57) ABSTRACT

A packet voice switch 60 and method for its operation are disclosed. The switch comprises a network switching means, preferably implemented within its host processor 78, that allows calls to be routed between a circuit-switched connection at circuit-switched interface 74 and either another circuit-switched connection at interface 74 or a packet-switched connection at packet-switched interface 76. The network switching means selects call routing for calls based on a comparison of the current quality of service for the call over the packet-switched connection vs. the extra cost of connecting the call over the circuit-switched connection. Preferably, the comparison can be adjusted for call distance, the user's own quality of service preference, and current system load.

In a preferred embodiment, switch 60 communicates with a similar packet voice switch (handling the other end of the same call) in order to initiate a mid-call network switch that is transparent to the calling and called parties. This embodiment provides a guaranteed minimum quality of service for packet voice applications, and provides a reliable backup in case of a packet data route failure.

In a second embodiment, users may initiate network switching themselves if they desire higher quality, by entering an appropriate sequence on their DTMF keypad.

30 Claims, 8 Drawing Sheets

U.S. PATENT DOCUMENTS

| | | | |
|---|---|---|---|
| 6,122,255 A | 9/2000 | Bartholomew et al. | 370/237 |
| 6,137,792 A | 10/2000 | Jonas et al. | 370/354 |
| 6,192,045 B1 | 2/2001 | Williams et al. | 370/352 |
| 6,282,192 B1 | 8/2001 | Murphy et al. | 370/352 |
| 6,307,853 B1 * | 10/2001 | Storch et al. | 370/354 |
| 6,324,280 B2 | 11/2001 | Dunn et al. | 379/230 |
| 6,452,922 B1 * | 9/2002 | Ho | 370/352 |
| 6,574,216 B1 * | 6/2003 | Farris et al. | 370/352 |
| 6,590,869 B1 * | 7/2003 | Beyda et al. | 370/248 |
| 6,597,686 B1 * | 7/2003 | Smyk | 370/352 |
| 6,628,666 B1 * | 9/2003 | Pickering et al. | 370/468 |
| 6,674,713 B1 * | 1/2004 | Berg et al. | 370/217 |
| 6,731,625 B1 * | 5/2004 | Eastep et al. | 370/352 |
| 2003/0039237 A1 * | 2/2003 | Forslow | 370/352 |
| 2003/0095542 A1 * | 5/2003 | Chang et al. | 370/352 |

* cited by examiner

PACKET-SWITCHED TELEPHONY WITH CIRCUIT-SWITCHED BACKUP

This application is a continuation of prior U.S. patent application Ser. No. 09/304,032, filed May 3, 1999, now U.S. Pat. No. 6,781,983, issued Aug. 24, 2004.

FIELD OF THE INVENTION

This invention pertains generally to telephony, and more particularly to packet-switched telephony.

BACKGROUND OF THE INVENTION

Packet-switched telephony is an alternative to traditional circuit-switched telephony. In circuit-switched telephony, a circuit is dedicated to each active telephone call. In packet-switched telephony, the audio signal is partitioned into data "packets" that are individually routed over a data network, sharing the network's pathways with packets from many other sources. Before a packetized audio segment can be played out, its packets must be received and re-assembled.

Packet telephony has several advantages when compared with circuit-switched telephony. Packet telephony uses network resources efficiently, since packets need not be sent when no audio signal is present on the line. Packet telephony also often employs audio codecs (coder/decoder pairs) in order to compress the amount of data that must pass over the network. And with at least some packet telephony systems, users may avoid long distance charges that would be incurred with a circuit-switched connection.

Packet telephony also has disadvantages. Whereas a circuit-switched connection—once established—usually provides fairly consistent connection quality over the length of the call, a packet telephony connection may deliver widely-varying connection quality. Quality variations generally mirror the instantaneous packet delivery performance of the packet-switched connection, which in turn depends on the level of competing traffic. As traffic increases, packets may be delayed, increasing the latency of the connection. An increase in the interarrival jitter, which is an expression of the variation in packet transit times, also increases latency. In some cases, the network or receiver may throw away packets that have been delayed too long, causing dropouts in the reconstructed speech.

Figure 1:
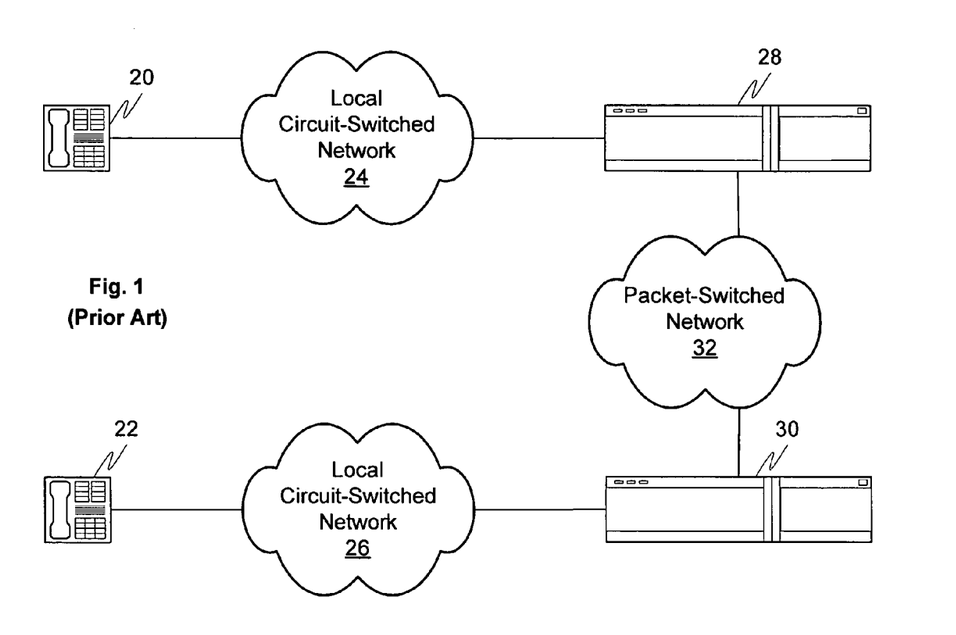
FIG. 1 illustrates a prior-art packet data telephony connection.

A typical packet-switched telephone connection is illustrated in FIG. 1. A calling party 20 connects over a local circuit-switched network 24 to a packet voice gateway 28. After connection, calling party 20 signals the number of a desired party to gateway 28. Gateway 28 attempts to locate a second gateway 30 that is local to the desired party. If such a gateway is found, a packet-switched connection is established with gateway 30 and the desired party's number is communicated to gateway 30. Gateway 30 connects to the desired party 22 through a second local circuit-switched network 26, and the connection is complete.

Figure 2:
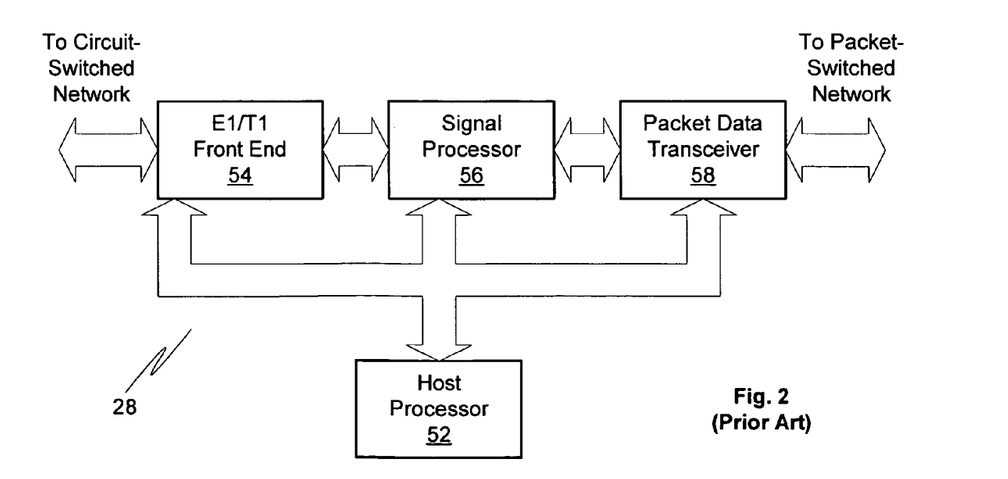
FIG. 2 contains a block diagram of a prior-art packet voice gateway.

A typical gateway 28 is illustrated in FIG. 2. The gateway communicates with a circuit-switched network through a front end 54, which typically terminates one or more TDM (time-division multiplexed) digital PCM (pulse-code modulated) circuit-switched telephony signals, such as those following the well-known T1 or E1 standards. On the other end of gateway 28, a packet data transceiver 58 communicates with a packet-switched network, e.g., using IP (Internet Protocol) or ATM (Asynchronous Transfer Mode) packets. In between front end 54 and transceiver 58, one or more signal processors 56 perform audio processing functions such as voice activity detection, DTMF detection, and audio coding and decoding on the audio data streams. A host processor 52 controls and coordinates the operation of gateway 28.

SUMMARY OF THE INVENTION

It is recognized herein that the uncertain quality of service associated with packet telephony is a major detriment to its widespread acceptance. The present invention attempts to provide a more uniform quality of service by providing a mechanism for re-routing calls from a packet-switched connection to a circuit-switched connection, and preferably, from a circuit-switched connection to a packet-switched connection. In other words, if the quality of a packet-switched connection is poor, the present invention enables a call to be switched to a circuit-switched connection transparently and with no apparent loss of connection. Preferably, if conditions later warrant re-establishing the packet-switched connection, this can also be accomplished.

In one aspect of the invention, a packet voice switch is disclosed. The switch comprises a telephony interface and a packet data interface, and coding/decoding means for converting data from circuit-switched to packet-switched formats (and vice-versa) as it passes between the interfaces. The switch further comprises call switching means that routes calls between the telephony interface and the coding/decoding means. The switch also comprises network switching means (preferably implemented on a host processor) for selecting call routing—the network switching means can route calls received at the telephony interface either back out through the telephony interface over another circuit, or through the coding/decoding means to the packet data interface.

In a second aspect of the invention, a method of operating a telephony switch connected to both a circuit-switched network and a packet-switched network is disclosed. The method comprises calculating the estimated quality of a packet-switched connection for a given call, and selecting, based on that quality, either a packet-switched connection or a circuit-switched connection for that call. The method further comprises connecting the call over the selected network.

In another aspect of the invention, a method of operating a packet voice switch connected to both a circuit-switched network and a packet-switched network is disclosed. The method comprises the steps of receiving an original call request over the circuit-switched network and routing the call request over the packet-switched network to a remote packet voice switch for call connection to a called party. The method further comprises responding to a network change request by rerouting the call over a long-distance circuit-switched network to the same remote packet voice switch.

In yet another aspect of the invention, a second method of operating a packet voice switch connected to both a circuit-switched network and a packet-switched network is disclosed. The method comprises the steps of receiving and acknowledging network switch requests from a second packet voice switch. The method further comprises matching an incoming circuit-switched connection from the second packet voice switch with an existing packet-switched connection from the same second switch, and then switching call voice data from the packet-switched to the circuit-switched connection.

BRIEF DESCRIPTION OF THE DRAWING

The invention may be best understood by reading the disclosure with reference to the drawing, wherein.

DETAILED DESCRIPTION OF THE PREFERRED EMBODIMENTS

The invention is described below with reference to specific implementations that show, for purposes of illustration, calling and called parties connected to local circuit-switched networks. Those of ordinary skill in the art will immediately recognize that the teachings contained in this disclosure apply equally to parties that establish telephone connections in other ways, e.g., by a local circuit- or packet-switched PBX (Private Branch eXchange), dedicated circuit connection to a central office, gateway, or switch, and/or direct connection to a data network.

For purposes of this disclosure, a packet voice switch is a device that can take call data from a circuit-switched telephony connection, packetize it, and route the packets to a remote destination (as well as accepting and de-packetizing such data and placing it on the circuit-switched connection). This definition thus includes packet voice gateways and gateway/circuit switch combinations. A telephony switch includes packet voice switches and circuit switches that operate in conjunction with, and at least partially control, packet voice gateways.

Figure 3:
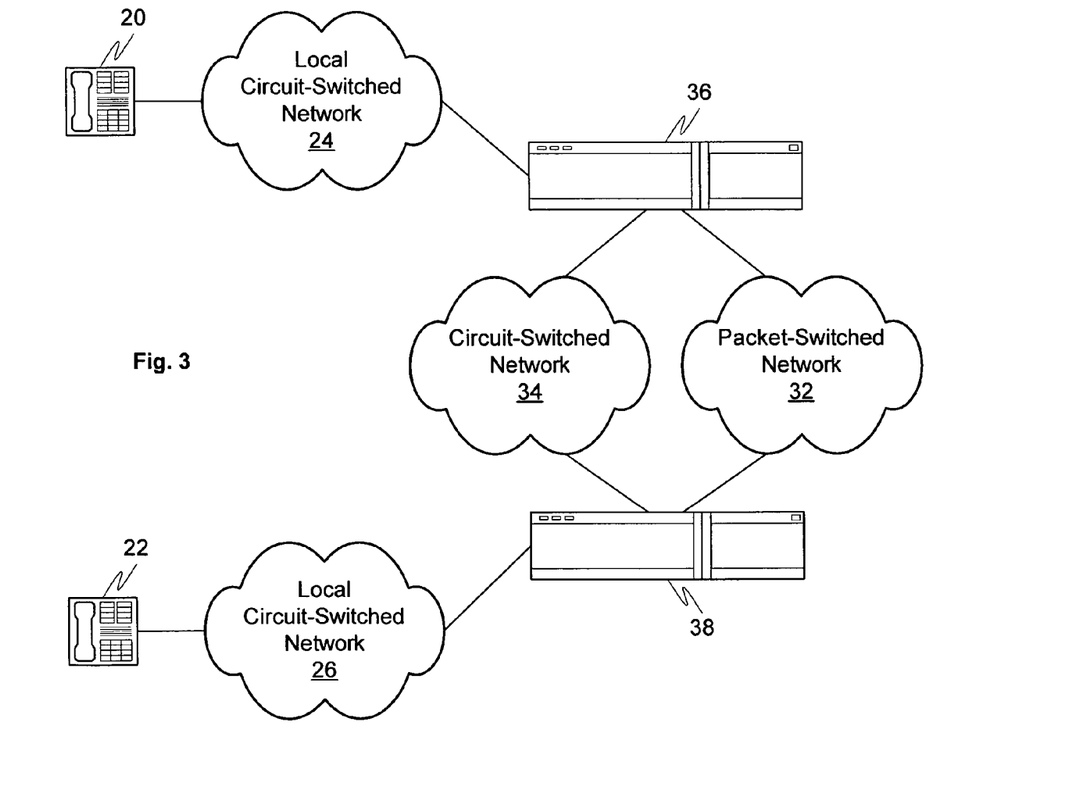
FIG. 3 illustrates conceptually a telephony connection according to the invention.

Without loss of generality, FIG. 3 shows the overall concept of the invention as it relates to two widely-separated parties 20 and 22, connected respectively to local circuit-witched networks 24 and 26. Packet voice gateways 36 and 38 also connect, respectively, to local circuit-switched networks 24 and 26. Gateways 36 and 38 are also interconnected via one or both of two possible paths—a packet-switched path through packet-switched network 32, and a circuit-switched path through circuit-switched network 34. Each gateway may serve only as a gateway to the packet-switched network with no direct circuit-witching function, or it may serve also as a circuit switch operating between a local circuit-switched network and circuit-switched network 34.

Operational Overview

Figure 4:
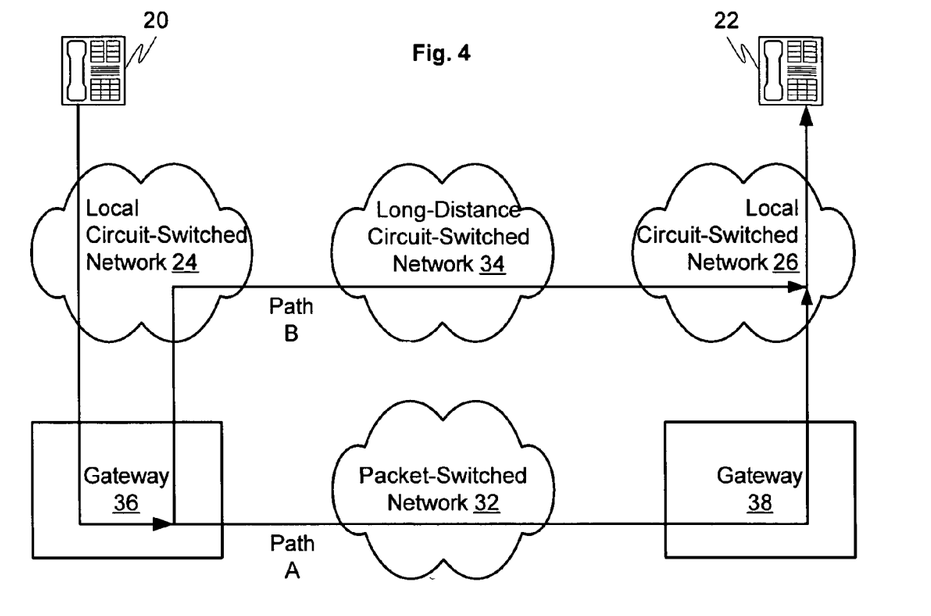
FIGS. 4, 5, and 6 show telephony signal routing for various embodiments of the invention.

The operation of a first, relatively uncomplicated embodiment of the invention is depicted in FIG. 4. In this embodiment, calling gateway 36 has network-switching capability although called gateway 38 does not. Thus a conventional path A travels the packet-switched network 32 as described with respect to FIG. 1, while path B bypasses gateway 38 altogether. Note that for this system to operate transparently, selection of either path A or B must occur before gateway 38 attempts to connect to called party 22 through local network 26. For a path switch to occur after initial path selection, called party 22 must either hang up or use a call-waiting feature to select a locally-separate connection.

Figure 5:
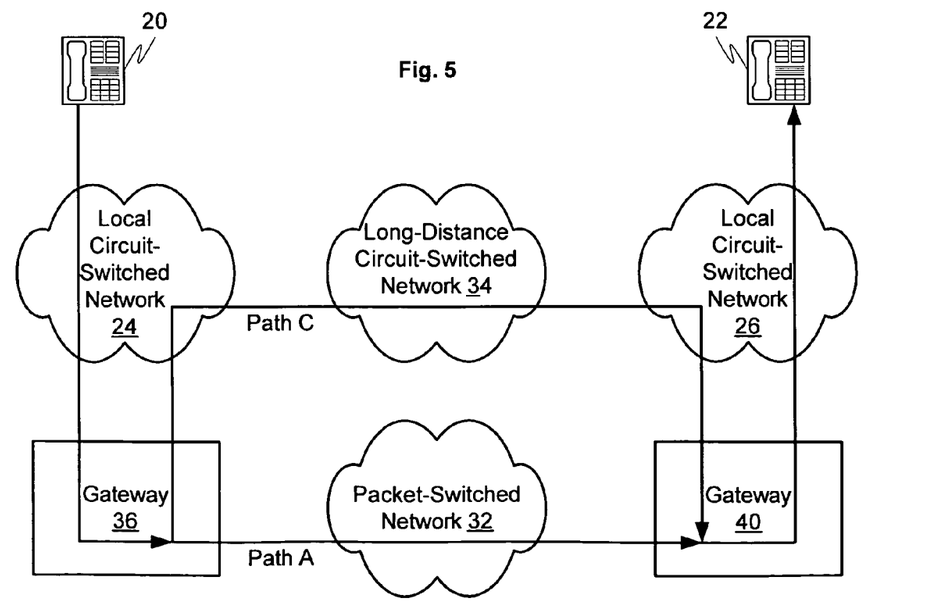

A more preferable operational environment is shown in FIG. 5. If both gateway 36 and gateway 40 have network-switching capability, paths A and C can each be set up and taken down by the gateways without disturbing the local connections to parties 20 and 22. This allows transparent switching mid-call, either from path A to path C or vice-versa.

Figure 6:
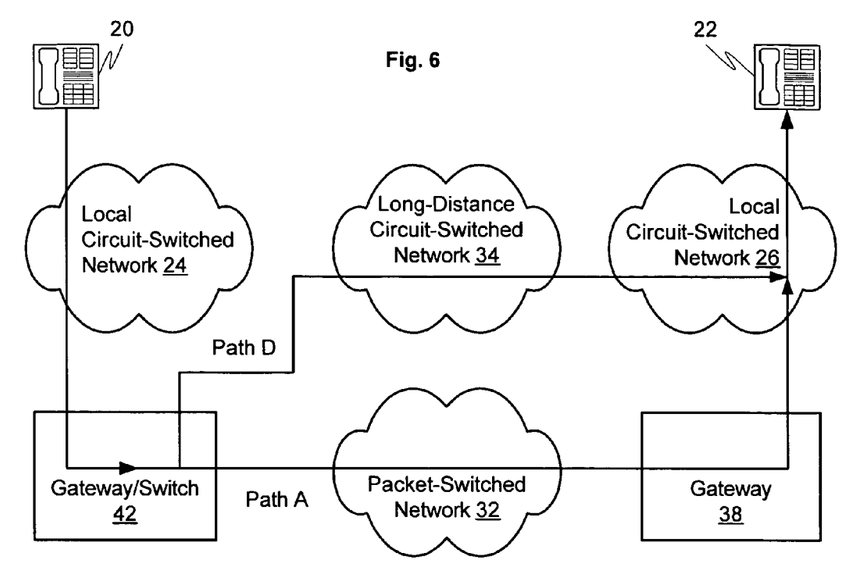

FIG. 6 illustrates an operational environment where the calling end has a gateway/switch 42 with a direct connection to long-distance circuit-switched network 34. Path D need not (and may be unable to) pass through local circuit-switched network 24 to reach network 34. Although FIG. 6 shows called-end fuctionality similar to FIG. 4, gateway/switch 42 can be used equally with the connection to gateway 40 of FIG. 5 or with a second gateway/switch like 42, with a similar connection to network 34, at the called end.

Hardware

Figure 7:
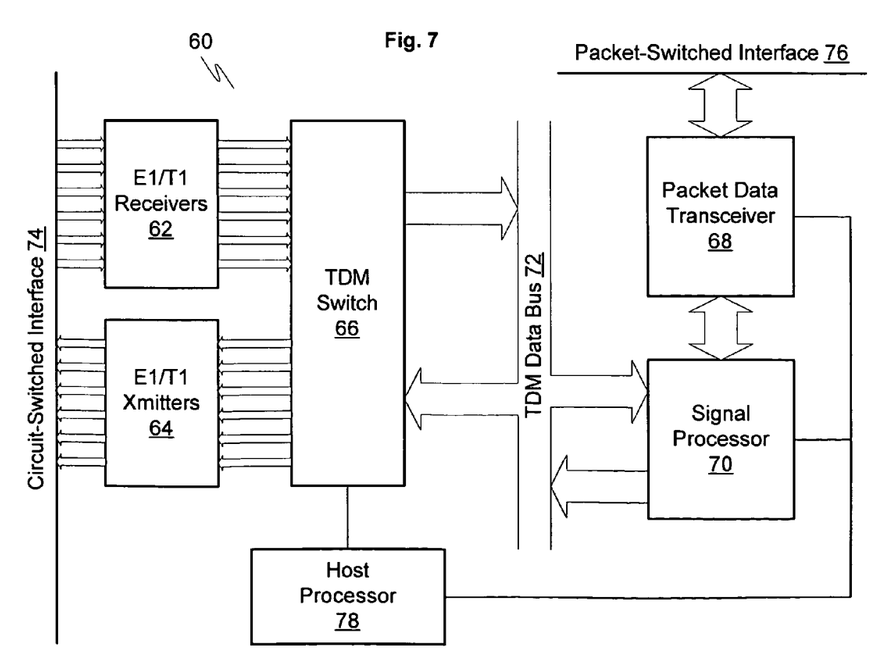
FIG. 7 shows a block diagram for the telephony data section of a network-switching gateway according to the invention.

The hardware necessary to implement one embodiment of the invention is shown in FIG. 7. One or more E1/T1 receivers 62 and transmitters 64 are connected to a circuit-switched network (e.g., a local central office) at a circuit-switched interface 74. Receivers 62 and transmitters 64 perform line matching and termination, circuit protection, signal conditioning, signal detection, and synchronization. The receivers and transmitters communicate with TDM switch 66, which also communicates with TDM data bus 72. Typically, data bus 72 operates at a much higher clock rate than receivers 62 and transmitters 64, and TDM switch 66 performs multiplexing and demultiplexing operations to deliver data appropriately to both sides.

Signal processor 70 also communicates with TDM data bus 72. Processor 70 selects incoming voice data from one timeslot on data bus 72, and supplies outgoing voice data to data bus 72 during a separate timeslot. Processor 70 performs operations such as voice compression/decompression, voice activity detection, and DTMF detection, and supplies data to packet data transceiver 68 for packetization and transmittal. Processor 70 also accepts incoming packet data from packet data transceiver 68 and processes this data to create an outgoing voice data stream. A typical gateway 60 comprises an array of such processors similarly connected to TDM data bus 72 and packet data transceiver 68. Host processor 78 controls overall system operation, and preferable implements the network selection means for the system.

Considering the one-way voice stream originating at a local circuit-switched caller, gateway 60 has the flexibility to transmit the voice stream along one of several paths. One path through gateway 60 is the conventional packet voice application path—through circuit-switched interface 74 to one receiver 62, TDM switch 66, signal processor 70, and packet data transceiver 68 to a packet-switched network. Additionally, gateway 60 can transmit the voice stream along at least one alternate path.

One alternate path is through one receiver 62, TDM switch 66, and back out through one of transmitters 64. Once set up, this path performs nothing more than a timeslot interchange and retransmission of the received PCM data across the circuit-switched network. Note that the transmitter may be connected to the local circuit-switched network (e.g., as shown in FIGS. 4 and 5), or may be connected to a long-distance circuit-switched network (e.g., as shown in FIG. 6). Path set-up will be addressed in the following section.

A second alternate path is through one receiver 62, TDM switch 66, signal processor 70, back to TDM switch 66, and then back out through one of transmitters 64. This path can utilize the compression capabilities of the gateway to reduce the data bandwidth as it would be reduced for packet-switched transmission. The compressed data can then, optionally, share an outgoing timeslot with other voice or data transmissions bound for the same destination gateway. Note that such a configuration most likely requires that a compatible gateway exist at the other end to comprehend the sharedtimeslot data and re-partition it, and that the intervening connection remain digital. A third possible path is similar to the third path, but includes the packet data transceiver in the loop, and sends the information in packets out over the circuit-switched network.

Determining Network Switch Conditions

Preferably, a gateway or switch operating according to the present invention performs relatively few network switches. Two general methods for determining when a switch is appropriate are comprehended by the invention—a network performance-based approach, and a caller-initiated approach. In the network performance-based approach, a system function trades various aspects of the operational condition of each network pathway against each other, using caller and/or system preferences. In the caller-initiated approach, a caller requests a network switch, preferably by entering a pre-defined in-band signal on their keypad.

Performance-Based Switching

Performance-based switching encompasses a wide range of flexibility, allowing only a few (or many) factors to be considered before a decision to switch a call to a different network is reached. Generally, the results of such a consideration can be quantified as a "figure of merit" (FOM) for each possible network path. The figures of merit can then be compared to reach a decision. An alternative approach is a rule-based approach—in essence, rules avoid computation of an express figure of merit by fitting the factors into a preset decision path, although the results of this approach can be similar to those obtained with a figure of merit approach. Hybrid approaches and other decision-making equivalents are also possible.

For a packet-switched network path, several factors are pertinent to connection performance. One measurable factor is latency. As the estimated one-way latency for a call increases beyond about 250 ms, the perceived quality of the connection decreases rapidly. Of course, one offsetting factor is physical distance, as most callers will tolerate greater latency, e.g., when they call across a continent, than they will tolerate when they call to a neighboring state.

Many latency measurement methods are known for estimating average packet transit times and packet interarrival jitter, which are the main components of latency. See, e.g., W. Montgomery, "Techniques for Packet Voice Synchronization", IEEE J. on Selected Areas in Comm., vol. SAC-1, No. 6, pp. 1022-1028, December 1983; R. Ramjee, et al., "Adaptive Playout Mechanisms for Packetized Audio Applications in Wide-Area Networks" in Proceedings of the Conference on Computer Communications (IEEE Infocom), (Toronto, Canada), pp. 680-688, June 1994. The particular latency measurement method selected for an application will depend on the transport and packet protocols and network capabilities.

Another measurable factor is packet loss, which includes packets lost or corrupted during transit, or packets received too late to be played out. Lost packet rates of several percent or greater tend to cause noticeable degradation in connection quality.

Latency and packet loss can be used to express a figure of merit, or to trigger rules for network switching. For example, ranges of latency are used in one embodiment to correspond to different levels of quality of service. These levels can also be indexed to ranges of call physical distance.

For a circuit-switched network path, assuming a circuit is available, the main factors to be considered are latency and cost. Latency may be fully comprehended in the distance-indexed quality of service discussed in the previous paragraphs, as the index can account for the expected latency for a circuit-switched connection. Cost is determined by the tariff structure of the circuit-switched network operator, and can most easily be determined by accessing a tariff database.

User preferences can also figure into a network-switching decision. Some users may prefer to use only packet-switched network paths, no matter what the quality of service. Other users may select different service plans that provide for switchover at different cost/quality breakpoints. The appropriate service plan for a caller is preferably retrieved from a database at call set-up. Databases can reside with the system, or can be remotely accessed, e.g., over the packet-switched network.

System considerations may also dictate network selection. For instance, if signal processing resources for a gateway are taxed, the gateway may switch higher quality-of-service level customers to a circuit-switched connection without increasing their cost—thus off-loading calls from their processor and allowing more connections to be serviced. On the other hand, the system may choose not to make circuit-switched connections when its circuit-switched interface is taxed. Such considerations can also be used to limit network switching during periods of high usage to only high QOS customers.

A system may also monitor its own health and switch active calls to a circuit-switched connection upon partial system failure. For instance, if the port used for egress to the packet-switched network fails, active calls can be switched to the circuit-switched network where possible. Or, in a system with multiple processors, each processing a portion of the calls entering the system, failure of some subset of the processors may leave the system unable to handle the signal processing required to process all calls over the packet-switched connection. The system can automatically reduce its processing requirements upon such a failure by switching some calls to circuit-switched connections. When, e.g., the faulty processing board is replaced, these circuit-switched connections can be switched back.

Caller-Controlled Network Switching

Caller-controlled network switching can be used in conjunction with performance-based switching, or in a standalone implementation. With caller-controlled switching, the caller has the ability to perform their own quality/cost analysis and "manually" switch networks. For example, a call may be initiated over the packet-switched network, and at some point the caller may determine that they want better quality for that call than their normal QOS provides, and that they will pay more for it. The caller can enter a DTMF code on their telephone keypad to signal the gateway that they are requesting a network switch.

Initiating Gateway Operation

The initiating gateway is the gateway accessed by the calling party. Normally, this gateway performs path selection (although no technological barrier prevents the receiving gateway from selecting a new path). The path selection operations are at least partially dependent on the functionality offered by the receiving gateway. The receiving gateway's level of functionality can be determined from stored information, or by querying the gateway at call initiation.

Operating Without a Matching Network-Switching Gateway

Figure 8:
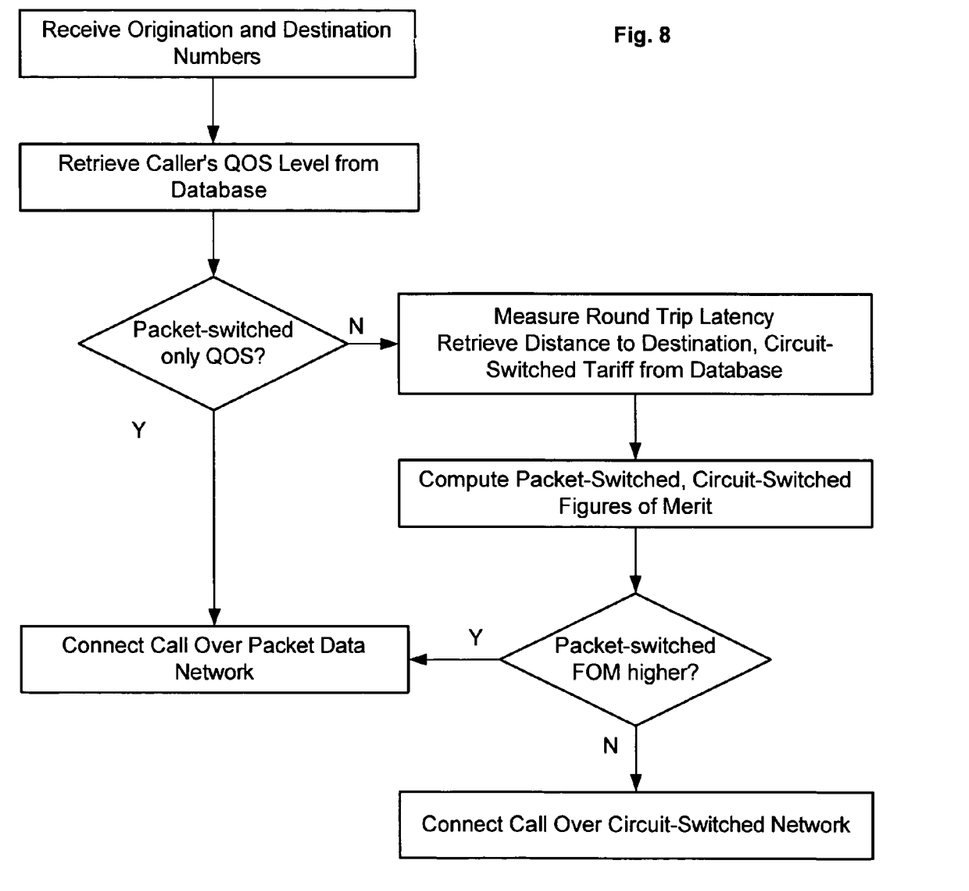
FIGS. 8, 9, 10, and 11 contain flowcharts for several switching methods according to the invention.

If the receiving gateway does not support network switching according to the invention, the initiating gateway may be limited to a one-time initial network selection. FIG. 8 contains a flowchart for one method of initiating gateway operation in such a case.

Referring to FIG. 8, the initiating gateway receives an origination number (e.g., a caller-ID signal or caller-entered signal that identifies the caller's account) and a destination number from the caller. The gateway then matches the caller with their selected QOS level. If the QOS level, alone or in combination with current system requirements, will not allow a circuit-switched connection, the call is connected over the packet data network.

If circuit-switched connections are allowable, the gateway next determines which network path is most desirable. First, the gateway gathers information. Round trip latency can be quickly estimated for the path to the receiving database. It may also be determined from recent past statistics, or by looking at other in-progress calls to the same ending gateway, if they exist. The gateway also finds the distance to the destination and the applicable tariff for a circuit-switched connection to the called party. These factors are then combined with QOS and system considerations, if applicable, to compute figures of merit for the packet-switched and circuit-switched potential connections. The figures of merit are then compared, and the appropriate connection is attempted.

Operating With a Matching Network-Switching Gateway

Figure 9:
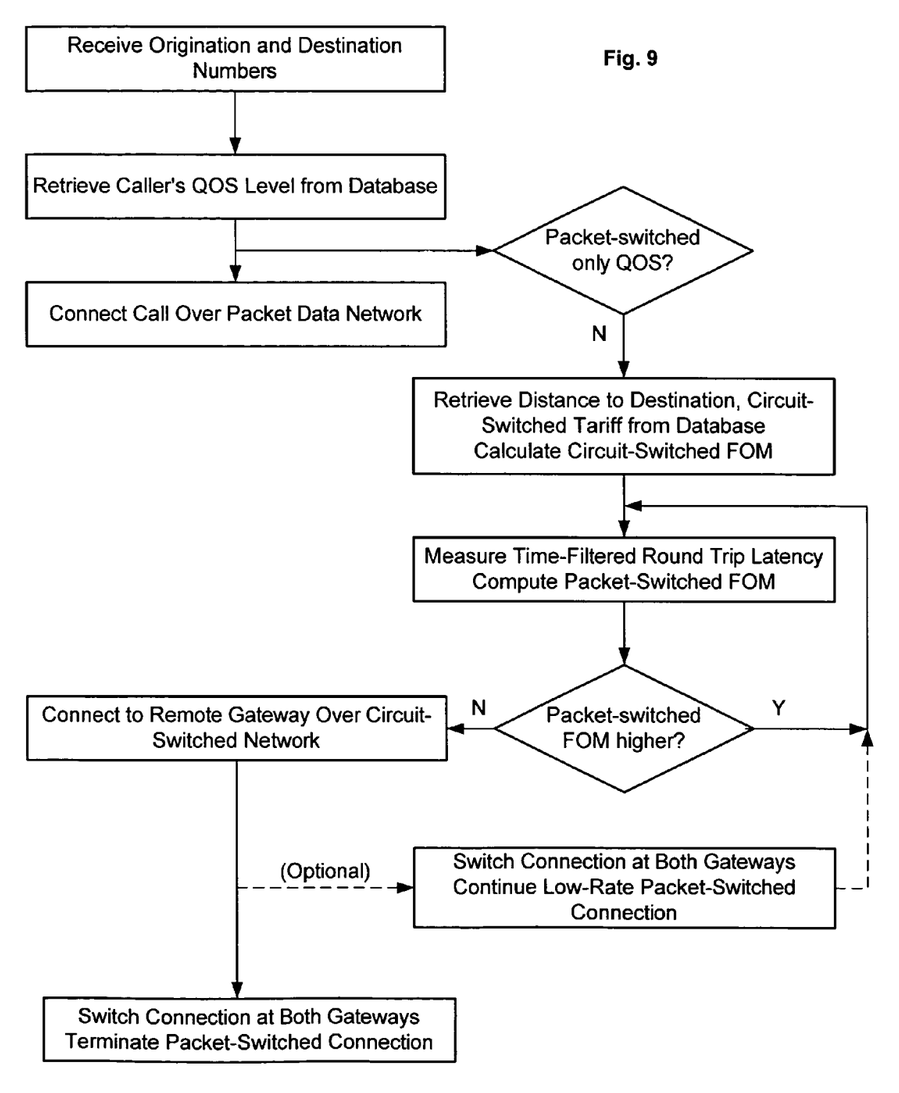

If the receiving gateway can perform network-switching operations, the initiating gateway is not limited to a one-time network decision, and can follow a decision flowchart such as the flowchart of FIG. 9. After receiving origination and destination numbers and determining the caller's QOS level as described above, the call is connected over the packet data network (of course, it is conceivable that conditions may warrant a circuit-switched connection that bypasses the receiving gateway as in FIG. 8).

If the QOS level allows network-switching, the gateway retrieves information similar to that retrieved in the embodiment above. Periodically, the gateway examines a time-filtered estimate of latency and computes a packet-switched figure of merit. As long as the packet-switched FOM remains greater than the circuit-switched FOM, no action is taken. If the packet-switched FOM drops below the circuit-switched FOM for the call, the initiating gateway attempts a parallel connection to the remote gateway over the circuit-switched network.

The new connection preferably requires some handshaking between the gateways. The initiating gateway first requests the switch by sending a control packet containing a network switch request to the receiving gateway. If the request is granted by an acknowledgment, the initiating gateway completes a circuit-switched connection by dialing out through its circuit-switched interface to the circuit-switched interface of the receiving gateway. When the receiving gateway answers, the initiating gateway identifies the connection as a parallel of the call's packet-switched connection. Once the new connection is acknowledged (using either connection for acknowledgment), the voice data is re-routed over the circuit-switched connection. The packet-switched connection can then be terminated.

The dashed pathway of FIG. 9 shows an alternate decision pathway that allows the call to revert to a packet-switched connection. Instead of terminating the packet-switched connection, low-rate packets continue to be sent between the gateways. For example, if the packet-switched connection was using RTP (Real-time Transport Protocol), the corresponding RTCP (Real-time Transport Control Protocol) packets can continue to be sent, along with empty or near-empty RTP packets at a lower rate. These communications can be used by the gateway to estimate latency. If the quality of the packet-switched connection increases, another network switch is initiated that is analogous to the first switch, and the circuit-switched connection can then be taken down.

Figure 10:
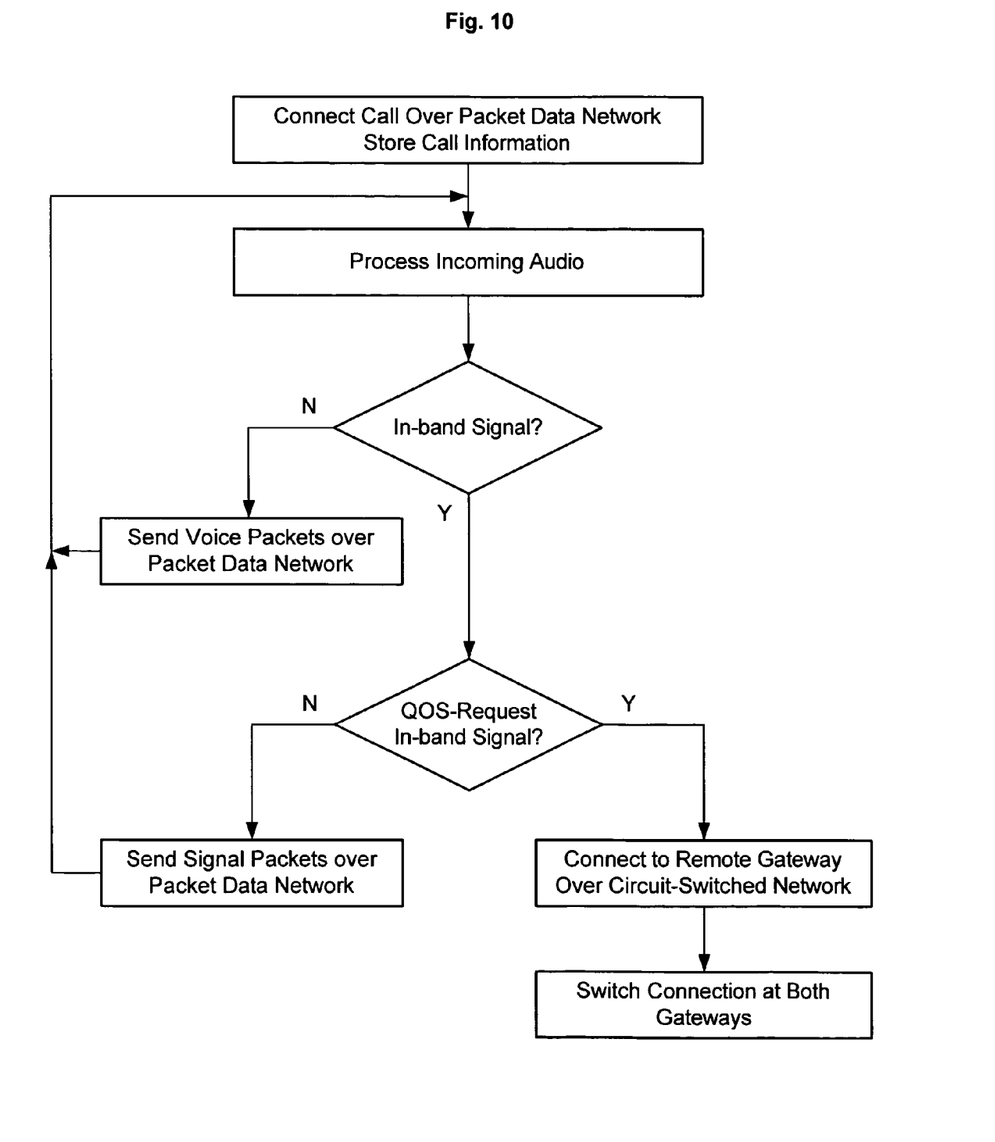

FIG. 10 shows an alternate decision flowchart for caller-controlled network switching. The call is connected over the packet data network, and the call information is stored. Incoming audio packets are processed normally, including in-band signal (e.g., DTMF signal) detection processing by a signal processor. When in-band signaling is detected, the signal is compared against a list of signals that should be "captured" by the gateway. If the signal does not match a signal from the list, a corresponding signal packet is generated and sent over the packet data network to the gateway at the other endpoint for signal reconstruction. If the signal does match one from the list, and it corresponds to a QOS-request signal, the system attempts to initiate a circuit-switched connection as described above. The gateway can optionally provide audible feedback to the caller as a tone or voice message, indicating the success or failure of the request operation.

Other signals can also be used to control user preferences in a system according to the invention. For instance, a caller may indicate a QOS level for the current call that is different from their default QOS, without explicitly requesting a circuit-switched connection. The system then uses the new QOS level to make network-switch decisions.

Receiving Gateway Operation

Figure 11:
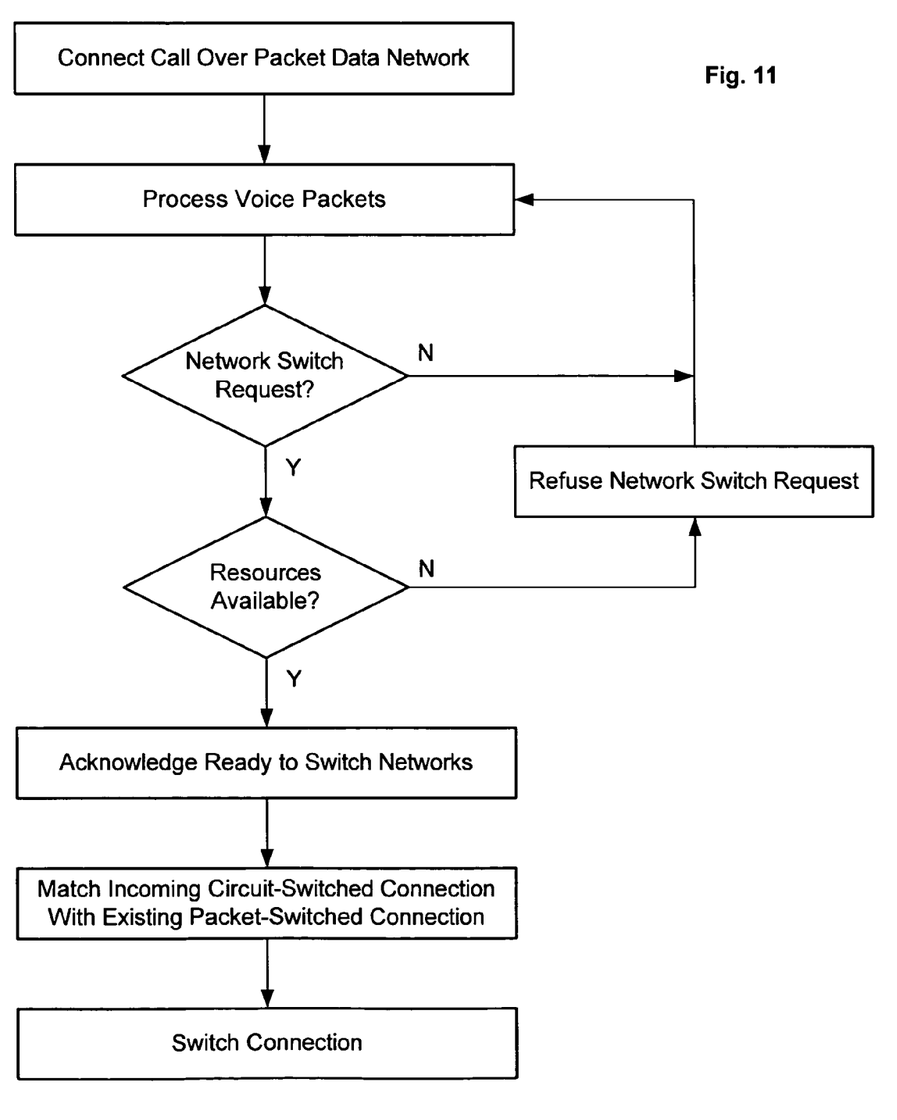

FIG. 11 shows a corresponding decision flowchart for a receiving gateway. The gateway essentially follows the requests of the initiating gateway. Its main control point reflects its ability to refuse a network switch request from the initiating gateway. For instance, when the receiving gateway receives a network switch request, it may examine the loading of its own resources and determine whether it is able to commit additional resources to a network switch.

When a receiving gateway acknowledges a request, and knows that it should expect a remote gateway to attempt a circuit-switched connection, it monitors newly-initiated circuit-switched connections. When it identifies the new connection that corresponds to the existing packet-switched connection, the gateway makes arrangements to associate this new pair of timeslots with the resources committed to the packet-switched connection. At an appropriate moment, the connection is then switched.

One of ordinary skill in the art will recognize that many advantageous modifications to the disclosed embodiments are enabled by the concepts taught herein. For example, the gateway/circuit switches can implement PBX (Private Branch eXchange) functions at different sites for a common enterprise. The gateways can decide whether traffic between the sites should use circuit-switched or packet-switched connections. If the enterprise pays for a certain number of dedicated circuits, these can be allotted in a predefined manner as call load between the sites varies. Optionally, compressed voice traffic can use the dedicated circuits instead of the packet data network when conditions warrant.

The present invention also is not limited to implementations where the circuit-switch is performed at the same physical location as the packet-switch. For instance, a circuit switch can gather latency and/or other statistics from an attached packet voice gateway over a control channel, and initiate switches of calls to and from the gateway using this same control channel. The control channel allows the switch to be logically connected, although not directly physically connected, to the packet-switched network for purposes of initiating network switches.

Other modifications to the disclosed embodiments will be obvious to those of ordinary skill in the art upon reading this disclosure, and are intended to fall within the scope of the invention as claimed.

What is claimed is:

1. A packet voice switch voice comprising:
   a telephony interface for connection to a circuit-switched network;

a packet data interface for connection to a packet-switched network;

means, in communication with the packet data interface, for converting voice data from a circuit-switched format to a packet-switched format and for converting voice data from the packet-switched format to the circuit-switched format;

means for routing calls between the telephony interface and the means for converting voice data; and means for selecting whether to route calls received at the telephony interface through the packet-switched network via means for converting voice data to the packet data interface or back through the circuit-switched network via telephony interface, where the means for selecting further comprises a means for determining a current utilization of the means for converting and where the means for selecting, selects the packet data interface or the telephony interface based on the current utilization of the means for converting;

where the means for routing calls is coupled to;
means for computing a first figure of merit for a connection over the packet-switched network;
means for computing a second figure of merit for a connection over the circuit-switched network; and
means for comparing the first figure of merit with the second figure of merit; and where the means for selecting depends, at least in part, on the comparison of the first figure of merit and the second figure of merit.

2. The packet voice switch of claim 1, where the means for selecting has the capability to reroute a call from a selected interface to a different interface while the call is in progress.

3. The packet voice switch of claim 1, comprising means for determining the apparent latency of a connection over the packet-switched network, where the means for determining the apparent latency supplies latency measurements to the means for computing the first figure of merit.

4. The packet voice switch of claim 3, where the means for determining the apparent latency estimates latency based on packet statistics for an existing packet data connection.

5. The packet voice switch of claim 1, comprising an in-band signal processor that detects in-band signals and supplies the in-band signals to the means for selecting.

6. The packet voice switch of claim 1, comprising means for retrieving quality of service factors for a selected call from a database, and supplying the service factors to the means for selecting.

7. The packet voice switch of claim 1, where the means for selecting is responsive to requests, received from another packet voice switch, for switching a call currently handled by both switches from a packet-switched to a circuit-switched voice data connection.

8. The packet voice switch of claim 7, where the means for selecting is responsive to requests, received from another packet voice switch, for switching a call currently handled by both switches from a circuit-switched to a packet-switched voice data connection.

9. A packet voice switch comprising:
a telephony interface to connect to a circuit-switched network;
a packet data interface to connect to a packet-switched network;
a signal processor coupled to the packet data interface, to convert voice data from a circuit-switched format to a packet-switched format and voice data from the packet-switched format to the circuit-switched format;
a switch configured to route a circuit-switched call between the telephony interface and the signal processor and configured to route the circuit-switched call between two circuit-switched network connections of the telephony interface; and
a host processor to control the operation of the switch and the signal processor, where the host processor is configured to:
calculate a first figure of merit for a connection routed over the packet-switched network;
calculate a second figure of merit for a connection routed over the circuit-switched network;
compare the first figure of merit with the second figure of merit; and
select whether to route the circuit-switched call between the telephony interface and the signal processor or between two circuit-switched network connections based on the comparison of the first figure of merit and the second figure of merit and based on a switch request received from a remote network device, and where the host processor is configured to refuse the request based on availability of processing resources of the packet voice switch.

10. The packet voice switch of claim 9, where the host processor is configured to reroute a call from a selected interface to a different interface while the call is in progress.

11. The packet voice switch of claim 9, where the host processor is configured to switch a call, currently handled by the packet voice switch and the remote network device, from a packet-switched to a circuit-switched voice data connection.

12. The packet voice switch of claim 11, where the host processor is configured to switch the call, currently handled by the packet voice switch and the remote network device, from a circuit-switched to a packet-switched voice data connection.

13. The packet voice switch of claim 11, where the switch is configured to maintain the packet-switched voice data connection after the call switch.

14. The packet voice switch of claim 9, where the host processor is configured to acknowledge the request, to associate an incoming circuit-switched connection from the remote network device with the packet-switched call, and to switch the call, currently handled by the packet voice switch and the remote network device, from the packet-switched connection to the circuit-switched connection.

15. The packet voice switch of claim 9, where;
the first figure of merit calculation is based at least in part on: apparent latency, distance or packet loss, or combinations thereof; and
the second figure of merit calculation is based at least in part on apparent latency or cost, or combinations thereof.

16. A packet voice switch comprising: a telephony interface to connect to a circuit-switched network;
a packet data interface to connect to a packet-switched network;
a signal processor in communication with the packet data interface, to convert voice data from a circuit-switched format to a packet-switched format, and to convert voice data from the packet-switched format to the circuit-switched format; and
a host processor configured to;
determine a first apparent latency for a connection on the packet-switched network;
determine a second apparent latency for a connection on the circuit-switched network;

access one or more network switching rules from a database, where the rules correspond to the first apparent latency or the second apparent latency, or combinations thereof; and select, based at least in part on the rules, whether to route calls received at the telephony interface through the signal processor to the packet-switched network via the packet data interface or back through the circuit-switched network via the telephony interface;

where the host processor is configured to determine an estimated quality of a packet-switched connection for a paticular call, and to select, based at least partially on the estimated quality, either a packet-switched connection or a circuit-switched connection for the particular call; and where the estimated quality is offset by physical distance of the particular call and increases with increasing physical distance.

17. The packet voice switch of claim 16, where the host processor is configured to reroute the particular call from a selected interface to a different interface while the particular call is in progress.

18. The packet voice switch of claim 16, where the network switching rules further correspond to a first and second figure of merit and where the host processor is further configured to;

compute the first figure merit for connection of the particular call over the circuit-switched network;

compute the second figure of merit for connection of the particular call over the packet-switched network; and select the network with the most favorable figure of merit.

19. The packet voice switch of claim 16, where the;

the host processor is further configured to determine; a tariff for the circuit-switched connection, a packet loss value, a physical distance between an origination and destination of the particular call, a user preference for the circuit-switched connection or the packet-switched connection, a quality of service, availability of system resources or a user override condition, or combinations thereof; and the network switching rules correspond to a tariff for the circuit-switched connection, a packet loss value, a physical distance between an origination and destination of the call, a user preference for the circuit-switched connection or the packet-switched connection, a quality of service, availability of system resources or a user override condition, or combinations thereof.

20. The packet voice switch of claim 16, comprising a switch to route calls between the telephony interface and the signal processor.

21. The packet voice switch of claim 20, where the circuit-switched connection is selected, the switch is configured to maintain the packet-switched connection at a reduced packet transmission rate.

22. The packet voice switch of claim 16, comprising an in-band signal processor that detects in-band signals and supplies them to the host processor, where the host processor is configured to select either the packet-switched connection or the circuit-switched connection for the particular call.

23. The packet voice switch of claim 16, comprising a health monitor to monitor the health of the packet voice switch and to generate a network change request for one or more active packet-switched calls upon detection of a failure of switch hardware necessary to support the one or more active packet-switched calls.

24. An apparatus comprising:
a processor; and
a memory coupled to the processor, the memory including a set of functions stored therein and executable by the processor to:
calculate an estimated quality of a packet-switched connection for a given call;
select, based at least partially on the estimated quality, either a packet-switched connection or a circuit-switched connection for the given call; and
connect the given call over the selected network;
where the estimated quality is offset by the physical distance of the given call and increases with increasing physical distance of the given call.

25. An apparatus comprising:
a processor; and
a memory coupled to the processor, the memory including a set of functions stored therein and executable by the processor to:
calculate an estimated quality of a packet-switched network connection for a given call; selecting, based on the estimated quality: either the packet- switched network connection or a circuit-switched network connection for the given call, where selecting is also based on the current utilization of signal processing resources within a switch; and
connect the given call over the selected circuit-switched network or packet-switched network.

26. An apparatus comprising:
a processor; and
a memory coupled to the processor, the memory including a set of functions stored therein and executable by the processor to:
receive an original call request over the local circuit-switched network;
route the original call request over the packet-switched network to a remote packet voice switch for call connection to a called party;
respond to a network change request by rerouting the original call over a long-distance circuit switched network to the remote packet voice switch;
process incoming audio for the presence of a user-generated in-band signal; and
generate a network change request when an appropriate in-band signal is detected in the incoming audio.

27. An apparatus comprising:
a processor; and
a memory coupled to the processor, the memory including a set of functions stored therein and executable by the processor to:
receive an original call request over the local circuit-switched network;
route the original call request over the packet-switched network to a remote packet voice switch for call connection to a called party;
respond to a network change request by rerouting the original call over a long-distance circuit-switched network to the remote packet voice switch;
monitor the health of the packet voice switch; and
generate a network change request for one or more active packet-switched calls upon detection of a failure of switch hardware necessary to support the one or more active packet-switched calls.

28. An apparatus comprising:
a processor; and
a memory coupled to the processor, the memory including a set of functions stored therein and executable by the processor to:

receive a network switch request, from a second packet voice switch, the request related to a packet-switched call existing between the two packet voice switches;

send a request acknowledgment to the second packet voice switch;

associate an incoming circuit-switched connection from the second packet voice switch with the packet-switched call; arid switch call voice data between the two packet voice switches from the packet-switched connection to the circuit-switched connection.

29. An apparatus comprising:

a processor; and a memory coupled to the processor, the memory including a set of functions stored therein and executable by the processor to:

calculate an estimated quality of a packet-switched connection for a given call;

estimate the latency of the packet-switched connection;

select, based at least partially on the estimated quality, either the packet-switched connection or a circuit-switched connection for the given call;

connect the given call over the selected network; and if the circuit-switched connection is selected, maintaining the packet-switched connection at a reduced packet transmission rate and estimating the latency of the packet- switched connection from the reduced packet transmission rate.

30. The apparatus of claim 29, the set of functions further comprising recalculating the estimated quality periodically while the given call is in progress, reselecting either the packet-switched connection or the circuit-switched connection using the recalculated estimated quality, and switching the given call to the packet-switched connection when the reselection selects the packet-switched connection.

* * * * *

UNITED STATES PATENT AND TRADEMARK OFFICE
CERTIFICATE OF CORRECTION

PATENT NO. : 7,668,158 B2 Page 1 of 1
APPLICATION NO. : 10/916054
DATED : February 23, 2010
INVENTOR(S) : R. Ashby Armistead It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1574 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,668,158 B2 | Page 1 of 1 |
| APPLICATION NO. | : 10/916054 | |
| DATED | : February 23, 2010 | |
| INVENTOR(S) | : Armistead | |

It is certified that error appears in the above-identified patent and that said Letters Patent is hereby corrected as shown below:

At column 8, line 65, please replace "switch voice comprising" with --switch comprising--.
At column 11, line 12, please replace "a paticular cell" with --a particular cell--.
At column 13, line 8, please replace "arid" with --and--.

Signed and Sealed this
Nineteenth Day of April, 2011

David J. Kappos
*Director of the United States Patent and Trademark Office*